C. BOHM.
CORN HARVESTER.
APPLICATION FILED OCT. 5, 1917.
1,257,972. Patented Mar. 5, 1918.
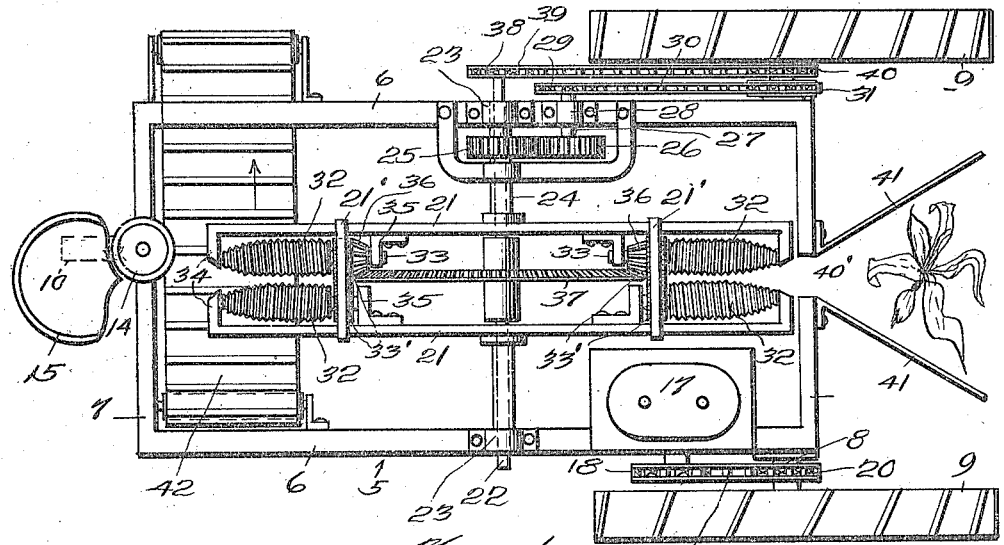
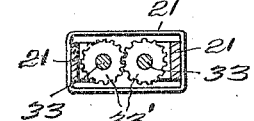
Fig. 3.
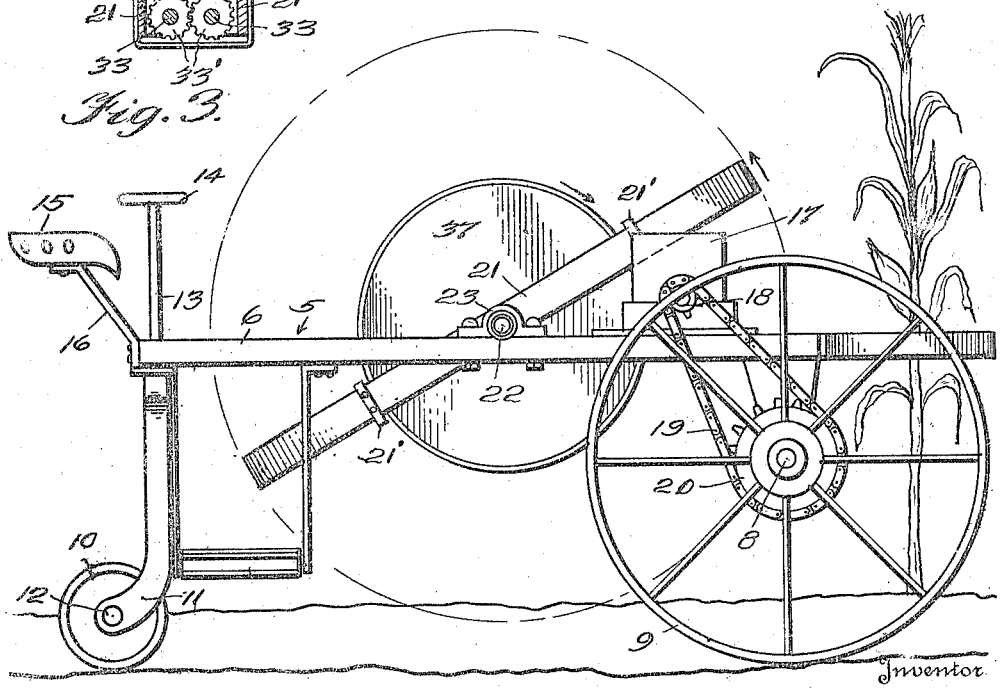
Fig. 2.
Inventor
Charles Bohm,

UNITED STATES PATENT OFFICE.

CHARLES BOHM, OF DU BOIS, NEBRASKA.

CORN-HARVESTER.

1,257,972.

Specification of Letters Patent.

Patented Mar. 5, 1918.

Application filed October 5, 1917. Serial No. 194,939.

*To all whom it may concern:*

Be it known that I, CHARLES BOHM, a citizen of the United States, residing at Du Bois, in the county of Pawnee and State of Nebraska, have invented certain new and useful Improvements in Corn-Harvesters, of which the following is a specification.

My invention relates to corn harvesters.

An important object of the invention is to provide a machine of the above mentioned character, which is adapted to be driven down or in proximity to a row of corn, and which will operate continuously during such travel to remove the ears of corn from the stalks, and discharge the same to a suitable point.

A further object of the invention is to provide a machine of the above mentioned character, which is simple in construction, inexpensive to manufacture, strong and durable.

Other objects and advantages of the invention will be apparent during the course of the following description.

In the accompanying drawings forming a part of this specification and in which like numerals are employed to designate like parts throughout the same;

Figure 1 is a plan view of a machine embodying my invention,

Fig. 2 is a side elevation of the same, and,

Fig. 3 is a transverse sectional view through the rotatable carrier, showing a pair of gears carried by the stripping elements.

In the drawings, wherein for the purpose of illustration is shown a preferred embodiment of my invention, the numeral 5 designates a frame or support as a whole, including longitudinal beams 6, connected by transverse beams 7. The frame 5 is connected at its forward end with an axle 8, disposed beneath the same, and secured thereto by any suitable means. This axle is rotatable and carries traction wheels 9, rigidly secured thereto. The rear end of the frame 5 is supported by a guide wheel 10, carried by a forked bracket 11, within which it is pivoted, as shown at 12. Secured to the upper end of the bracket 11 is a vertical shaft 13, having a hand wheel 14, attached to its upper end. Arranged near the hand wheel 14 is an operator's seat 15, carried by a bar 16, secured to the rear end of the frame 5.

The numeral 17 designates a prime mover, such as an internal combustion engine, driving a sprocket wheel 18. This sprocket wheel engages a sprocket chain 19, extending forwardly to engage a sprocket wheel 20, rigidly secured to the axle 8, to drive the same.

The numeral 21 designates a pair of rotatable carriers, which are rigidly connected, for rotation together, by means of transverse members 21'. These carriers constitute a rotatable support. The carriers 21 are pivoted upon a transverse rotatable shaft 22, journaled through bearings 23, attached to the longitudinal beams 6. One carrier 21 is rigidly attached to a sleeve 24, to be driven thereby, and this sleeve is equipped with a gear 25, to drive the same. The gear 25 is driven by a gear 26, carried by a stub-shaft 27, journaled through a bearing 28. The stub-shaft 27 is provided with a sprocket wheel 29, rigidly secured thereto, and engaged by a sprocket chain 30, extending rearwardly for engagement with a sprocket wheel 31, which is rigidly attached to the axle 8.

The numeral 32 designates stripping elements or rolls, which are radially disposed, have their outer ends tapered, and are screw-threaded throughout their entire length, as shown. These screw-threads of the rolls in each transverse pair are oppositely pitched, and the rolls in such pair rotate in opposite directions, thus tending to draw the ear of corn inwardly, with respect to the same. While these stripping rolls are shown as screw-threaded, which is the preferred construction, it is to be understood that the invention is not restricted to the employment of screw-threads, as the same may be omitted and the machine will be found to operate with some degree of success. The rolls 32 are rigidly secured to radially disposed shafts 33, which are journaled through bearings 34 and 35, secured to the carriers 21. Corresponding shafts 33 are provided with bevel gears 36, rigidly attached thereto, and engaging a main bevel gear 37, which is rigidly secured to the shaft 22. The bevel gear 37 is driven in an opposite direction to the carriers 21, and for this reason the shaft 22 has a sprocket wheel 38, rigidly secured thereto, and engaged by a sprocket chain 39, extending rearwardly to engage a sprocket wheel 40, rigidly attached to the axle 8. As more clearly shown in Fig. 3, the shafts 33 have gears 33', rigidly secured thereto, and these gears are in permanent mesh, thereby causing the stripping elements 32 to rotate in opposite directions.

The forward transverse beam 7 is provided with an opening 40', for the passage of the stalks of corn, and guide elements 41 are attached to this beam, at the opening 40', thus serving to direct the stalks into and through the opening 40', and between the stripping elements 32.

The operation of the machine is as follows:

The machine may be considered to be driven to the right, along or down the row of corn, while the carriers 21 are rotated counter-clockwise, or in the direction of the arrow, in Fig. 2. The stalks of corn, having the ears thereon, pass into and through the opening 40', and between the revolving stripping elements 32, which contact therewith, and serve to remove the ears from the stalk. These stripping elements turn in opposite directions upon their longitudinal axes, while bodily rotating with the carriers. The rotation of the main beveled gear 37, in an opposite direction to the rotation of the carriers, causes the stripping elements to be rotated at an increased speed, upon their longitudinal axes. These elements remove the corn from the stalks, as above stated, and carry the same over and discharge them upon a laterally extending endless conveyer 42, traveling in the direction of the arrow.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In a machine of the character described, a wheeled support, a rotatable support connected therewith, means to rotate the rotatable support, a pair of stripping elements rotatably mounted upon the rotatable support to turn upon their longitudinal axes with relation thereto, a corresponding number of gears connected with the stripping elements and having permanent engagement, a bevel gear connected with one stripping element to turn it upon its longitudinal axis, and a bevel gear for effecting the rotation of the first named bevel gear.

2. In a machine of the character described, a wheeled support, a rotatable support connected therewith, means to rotate the rotatable support, a pair of stripping elements rotatably mounted upon the rotatable support and extending radially with relation thereto, a corresponding number of gears connected with the inner ends of the stripping elements and in permanent engagement with each other, a beveled gear connected with the inner end of one stripping element and arranged inwardly of the first named gear carried thereby, a bevel gear having engagement with the first named bevel gear, and means to rotate the last named bevel gear.

3. In apparatus of the character described, a wheeled frame, a rotatable support connected therewith, means to rotate the rotatable support, pairs of stripping elements rotatably mounted upon the opposite ends of the rotatable support and extending radially thereof, pairs of gears connected with the inner ends of the stripping elements with the gears in each pair in permanent engagement with each other, bevel gears connected with the stripping elements in said pairs and arranged near the inner ends thereof, a common bevel gear engaging the first named bevel gears, and means to rotate the common bevel gear.

4. In apparatus of the character described, a wheeled frame, a rotatable support connected therewith, means to rotate the rotatable support, pairs of stripping elements having their surfaces screw-threaded throughout substantially their entire length and extending radially of the support and rotatably mounted thereon, pairs of gears connected with the inner ends of the stripping elements with the gears in each pair and in permanent engagement with each other, bevel gears connected with the stripping elements in the pairs of stripping elements and arranged near the inner ends thereof, a common bevel gear engaging the first named bevel gears, and means to rotate the common bevel gear.

In testimony whereof I affix my signature in presence of two witnesses.

CHARLES BOHM.

Witnesses:
G. W. POTTS,
JOSEPH MASHA.